Patented Mar. 4, 1952

2,588,308

UNITED STATES PATENT OFFICE 2,588,308

FRUIT WHIP

Donald K. Tressler, Westport, Conn.

No Drawing. Application August 23, 1949,
Serial No. 111,975

3 Claims. (Cl. 99—139)

This invention relates to an improved food composition and method of preparing a food product in the nature of a whip. An object of the invention is to provide a novel dessert product, which can be employed in the preparation of a number of different type of dessert and is particularly useful in the preparation of "whips" such as are highly desirable in the making of chiffon pie fillings or other forms of dessert wherein particles of air are incorporated into the mixture to give it an improved measure of lightness.

An important object of the present invention is to provide a novel food preparation employing milk solids and dehydrated fruits wherein there is no curdling of the milk when put into solution, due to reaction with the acids in the fruit.

A further object of the invention is to provide an improved food composition which can be used to produce a very considerable variety of desserts, both frozen and chilled, as well as those intended to be served at room temperature. The food product of the present invention can be used for preparing (1) a chiffon pie filling; (2) a whip; (3) a fruit pudding; (4) a fruit pie filling; (5) a sherbet; (6) a fruit salad.

The preparation of a whip is difficult for most housewives and substantially the same is true of chiffon pie fillings. Also, the preparation in the kitchen of sherbets having an approved amount of air particles to give the produce lightness is quite difficult.

I have discovered that if dehydrated milk powder is mixed with approximately an equal weight of gelatine and the products are then mixed with powdered dehydrated fruit such as apricots or prunes and sweetened with approximately an equal weight of sugar, a composition is obtained which, when dissolved in water, and then cooled and beaten with an egg beater, produces a light, a airy product similar in texture to a"whip" or a "chiffon" pie filling. The milk powder may be whole milk with normal butterfat content or the fat-free product.

The foregoing results are surprising and could not have been predicted since if fresh fluid milk is warmed with powdered dried fruit the milk is curdled by the action of the fruit acids and an inedible and unacceptable product results.

The incorporation of air into the solution described above is facilitated by the addition of a small amount of locust bean gum. The amount to be added is approximately one half of one per cent by weight on a dry basis. The addition of the locust bean gum is not essential to the production of a satisfactory whip although it does give a lighter product, a whip containing more and finer bubbles of air.

The improved product of the present invention can be used in a variety of ways. If it is partially frozen such as by inserting in an ice cube tray in the freezing compartment of a refrigerator and then whipped in a chilled bowl and refrozen, an excellent sherbet is obtained. If the product is allowed to cool without whipping, a soft jelly is obtained. It is a most delicious product when eaten as a dessert with or without being molded into an attractive shape.

Another method of use consists in cooling the product and then pouring it into a previously baked pie shell, and a pie is obtained which is substantially the consistency and texture of ordinary pumpkin pie but has the flavor of the fruit which has been used in making the product.

A particularly delicious fruit salad is obtained by adding to the solution of the food product cut or whole fruits such as grapes, oranges, apples, peaches, berries, and then put into a mold to cool.

Example 1

The following ingredients are mixed together:

| | Grams |
|---|---|
| Skim milk powder | 25 |
| Powdered gelatine | 21 |
| Granulated sugar | 111 |
| Ground dehydrated apricots | 60 |
| Spray dried lemon powder (containing 80% corn syrup solids) | 10 |
| Locust bean gum | 1 |
| Total | 228 |

The apricot powder was prepared by drying sun dried apricots in a dehydrating cabinet in circulating warm air at 160° F. until they were hard enough to be comminuted to an apparently dry powder (containing about 10% moisture) in a hammer mill operating at high speed in a cool (e. g. 40° F. or lower) room.

Equal success has been obtained by the use of apricots dehydrated in a vacuum dehydrator and also with the product prepared by dehydrating apricot puree on a conventional drum drier.

If the dehydrated fruit is not bone dry, i. e., it contains more than 10% of moisture, the powdered fruit is likely to cake as it comes from the hammer mill and as a consequence will be impossible to mix with the other dry ingredients. In this case the dehydrated apricots are first mixed with the other dry ingredients and the roung mixture is put through the hammer mill. This mixes the comminuted dried fruit with the other dry ingredients as it falls from the hammers. The mixture does not cake readily unless the total moisture content is above about 10%, provided, of course, it is stored at moderately cool temperatures (below 100° F.)

*Example 2*

A prune whip powder may be prepared by the same procedure followed in the making of the apricot whip powder described above, except the seeds of the dried prunes must be removed before the cut prunes are dehydrated to the necessary low moisture content. The proportions of the ingredients are the same as those used in making the apricot whip powder described above.

It is possible, of course, to vary the percentages of the several ingredients used in making the whip powder. If a more pronounced fruit flavor is desired, the percentage of the dehydrated fruit used is increased. If a less sweet product is wanted the amount of sugar used can be decreased.

If desired, the amount of the milk powder used can be greatly reduced but in that case the resultant whip is not so desirable because it is much "heavier" in that it does not contain so many nor as fine air bubbles.

Irish moss extract may be substituted for the locust bean gum, but the amount of Irish moss extract needed is substantially four times that of the locust bean gum used in the above formulas.

The food product described above must be kept either in an air tight container, such as a glass jar or tin can, or in a moisture vapor-proof carton lined or overwrapped with transparent plastic film, aluminum foil, or some other substance equally resistant to the passage of moisture vapor.

In making a whip or chiffon pie filling from the food product described above, four ounces of the powder may be placed in a pan, one-half cup of water added and the product stirred until smooth, after which one and a half cups more water are stirred in. The solution is heated to boiling or almost to the boiling point while stirring constantly. It is then allowed to cool for a few minutes (e. g. 5) and the pan is put in a refrigerator or the contents are transferred to a bowl and put in a refrigerator. When the product has formed a soft jelly which generally takes about an hour, it is removed from the refrigerator and whipped with an egg beater or electric mixer. When the product has approximately doubled in volume, the whip is ready for use, either as a dessert or as a chiffon pie filling.

In making the following: (1) a fruit pudding (2) a fruit pie filling and (3) a fruit salad, one may proceed exactly as described above in getting the product in solution in water. In other words, two cups of water are mixed with four ounces of the fruit product, the solution heated to boiling and then allowed to cool for about five minutes. It is then poured into (1) bowls or molds, if a fruit pudding is desired or (2) a prebaked pie shell, if a fruit pie is wanted or (3) mixed cut-up or whole fruit, if a molded fruit salad is wanted. These products are allowed to cool, preferably in a refrigerator, to permit the fruit pudding, pie-filling or salad to jell.

In making a sherbet from the fruit product described above, four ounces of the dried product are placed in a pan, one-half cup of water added and the solution stirred until smooth. Then one and a half cups more water are stirred in. The mixture is heated to the boil or almost to the boil to get the ingredients into solution. It is then allowed to cool for about five minutes. The mix may then either (1) be put into an ice-cream freezer and frozen, or (2) placed in an ice cube tray without dividers and the tray put in the freezing compartment of an electric refrigerator. When the mixture is about half frozen (in about thirty minutes) it is removed from the refrigerator, placed in a chilled bowl and beaten with an egg beater or electric mixer until the volume has about doubled, then returned to the ice cube tray for freezing.

It was earlier pointed out that whereas the locust bean gum or the Irish moss extract is not essential to the product although it does very considerably improve its whipping characteristics. In some instances I have found the product to have a 40% over run without the addition and as much as 100% with the addition.

Also the addition of the gum appears to cooperate with the gelatine in preventing curdling of the milk acids. The gelatine apparently has a protective colloid action insofar as the milk particle is concerned.

It will be appreciated that gums of vegetable origin other than those mentioned may be used. For instance, good success has been obtained with gum arabic, gum tragacanth, kelp extract, alginic acid, agar, gelidium, and other gums of vegetable origin which form collodial or mucilaginous solutions in hot water. The proportions of gums to the remainder of the product will vary, as was earlier pointed out. In no case, however, should it exceed 5% and usually will be between 0.4 and 2%.

The Irish moss extract, as well as the kelp extract, alginic acid, agar and gelidium are generally classified as phycocolloids. These substances are defined by C. K. Tseng in "Colloid Chemistry" by Alexander, Reinhold Pub. Co., 1946, page 629, as algal polysaccharides derived from brown and red seaweeds, able to form collodial systems when dispersed in water.

What I claim is:

1. A dry powdered product for the making of a fruit whip by the addition thereto of water, such product comprising a mixture of the following in substantially these proportions:

| | Parts by weight |
|---|---|
| Milk powder | 10 |
| Gelatine | 10 |
| Sugar | 50 |
| Dehydrated fruit | 30 |
| Irish moss extract | 1 |

2. A powdered for the making of a fruit whip by the addition thereto of water, such product comprising a mixture of the following in substantially these proportions:

| | Parts by weight |
|---|---|
| Milk powder | 25 |
| Gelatine | 21 |
| Sugar | 111 |
| Dehydrated fruit | 60 |
| Lemon powder | 10 |
| A phycolloid | 1 |

3. A dry powdered product for the making of fruit desserts by the addition thereto of water comprising a mixture of the following dry ingredients in substantially the following proportions by weight:

| | Per cent |
|---|---|
| Milk | 10 |
| Gelatine | 9.5 |
| Sugar | 50 |
| Dehydrated fruit | 30 |
| Irish moss extract | 0.51 |

DONALD K. TRESSLER.

REFERENCES CITED

The following references are of record in the file of this patent:

UNITED STATES PATENTS

| Number | Name | Date |
|---|---|---|
| 2,002,963 | Schade | May 28, 1935 |
| 2,029,025 | Justheim | Jan. 28, 1936 |
| 2,060,679 | Lepper | Nov. 10, 1936 |
| 2,103,411 | Frieden et al. | Dec. 28, 1937 |
| 2,431,704 | Musher | Dec. 2, 1947 |

FOREIGN PATENTS

| Number | Country | Date |
|---|---|---|
| 110,068 | Australia | Mar. 8, 1940 |